Dec. 7, 1926.
J. DEL COZZO ET AL
AUTOMOBILE HEATER
Filed Dec. 7, 1925
1,610,042
2 Sheets-Sheet 2
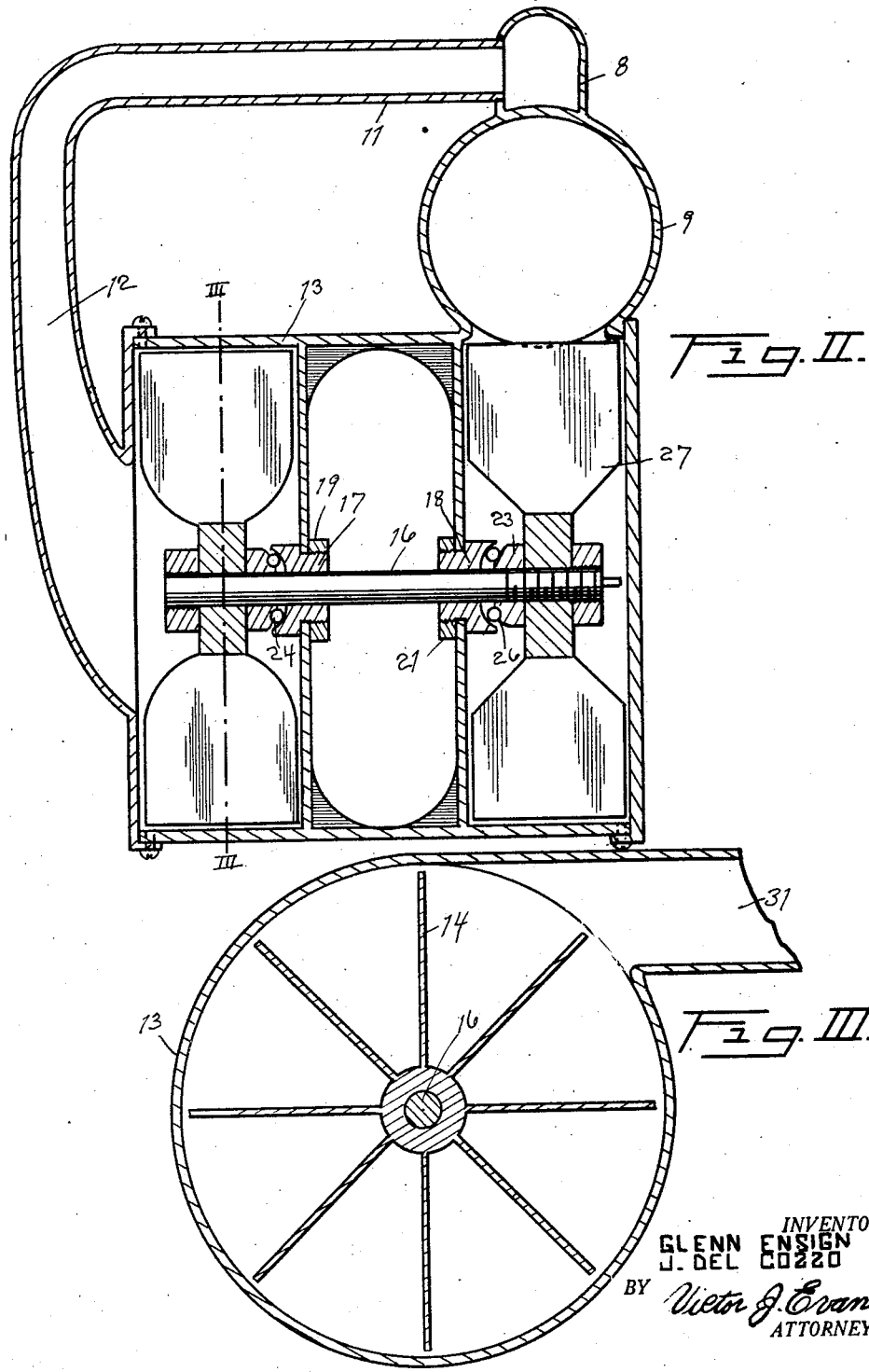
INVENTORS
GLENN ENSIGN
J. DEL COZZO
BY Victor J. Evans
ATTORNEY Patented Dec. 7, 1926.

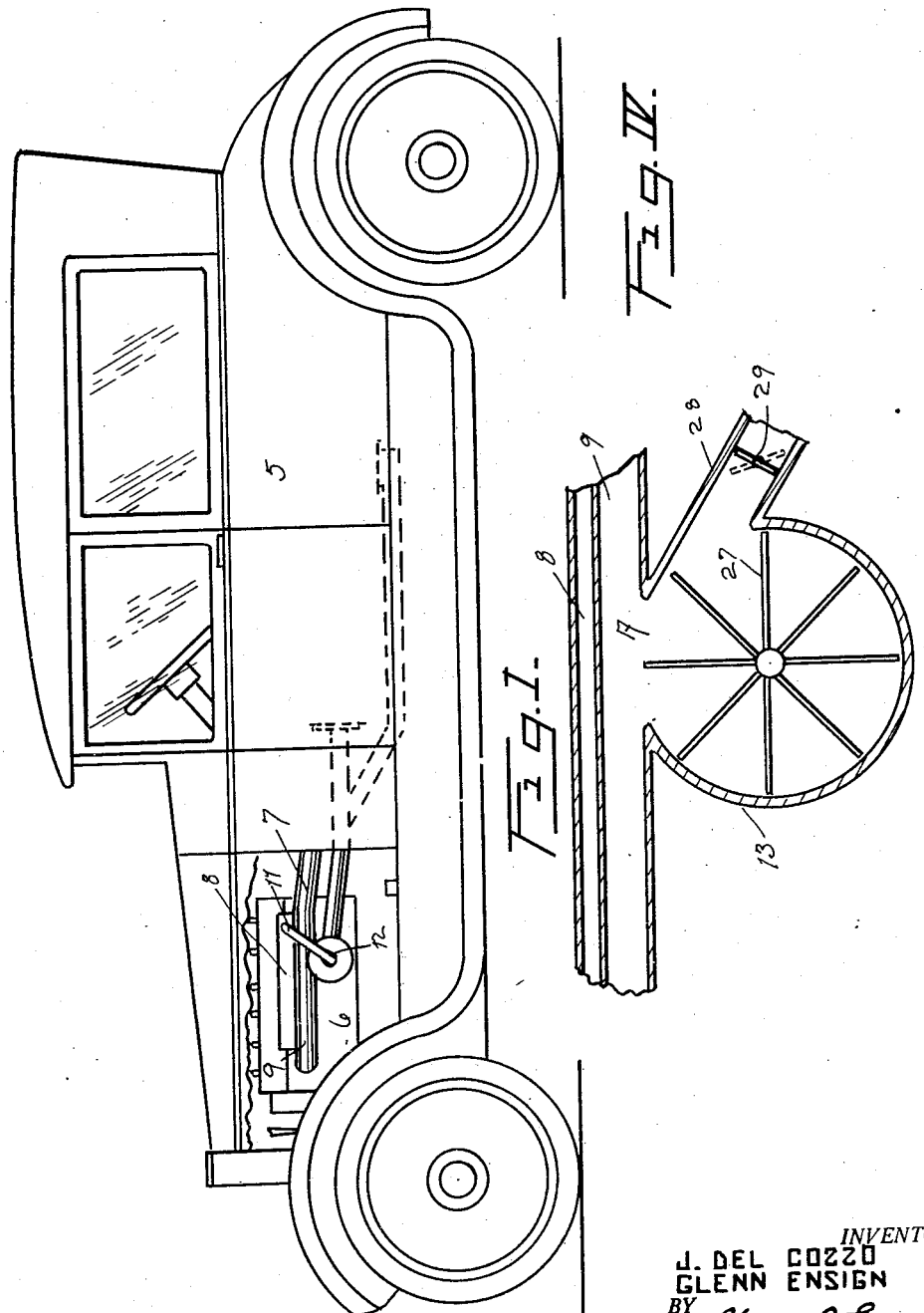

1,610,042

UNITED STATES PATENT OFFICE.

JOSEPH DEL COZZO AND GLENN ENSIGN, OF SCOTIA, CALIFORNIA.

AUTOMOBILE HEATER.

Application filed December 7, 1925. Serial No. 73,885.

This invention relates to improvements in automobile heaters.

The principal object of this invention is to provide means for heating the interior of an automobile from the heat ordinarily wasted by passing out of the exhaust pipe and muffler.

Another object is to provide simple and efficient means for obtaining the delivery of a current of heated air to the interior of an automobile without permitting the said air to be contaminated by the exhaust gases.

Another object is to produce a device of this character which is simple in construction and one which may be attached to the ordinary automobile without altering the construction of the same.

A further object is to provide a device of this character which is cheap to manufacture.

A still further object is to provide simple means for adjusting the device without disassembly.

Other objects and advantages will be apparent during the course of the following description.

In the accompanying drawings forming a part of this specification and in which like numerals are employed to designate like parts throughout the same, Figure I is a side elevation of an automobile having our device applied thereto, Figure II is an enlarged vertical cross-section of our device, Figure III is a cross section taken on the line 3—3 of Figure II, and Figure IV is a detail cross-section showing the exhaust fan.

Applicants have provided a very simple means whereby a positive draft of warm air is delivered to the interior of the vehicle, and by referring to the drawings in detail it will be noted that the numeral 5 designates an automobile having an engine 6 and an exhaust pipe 7. To this exhaust pipe is attached a heating chamber 8 which is preferably cast integral with the exhaust pipe manifold 9. This heating chamber has a suitable opening therein so that air may be drawn therein and then passed outwardly through a pipe 11 and downwardly through a goose neck 12 to the fan housing 13 where it is delivered to the center of a fan 14 mounted upon a shaft 16. This shaft is mounted in bearings 17 and 18 which are adjustably held as by nuts 19 and 21 respectively. Cones 22 and 23 bear against ball bearings 24 and 26 which contact the bearings 17 and 18 respectively. This permits the free turning of the shaft 16.

Upon the opposite end of the shaft from the fan 14 is a power fan 27, the blades of which may be spoon-shaped, if desired.

A branch exhaust pipe is shown at 28 within which is mounted a valve 29 controlled from a point adjacent the driver's seat.

A pipe 31 extends from the housing 13 and serves to conduct the heated air to the interior of the vehicle as shown in dotted lines in Figure I.

The operation of our device is as follows:—

Assuming that the engine is running so that the exhaust gas is passing therefrom, this gas will pass through the exhaust manifold 9 and contact the ends of the blades 27 by passing through the opening A. The effect of this rotation will be transmitted through the shaft 16 to the blades 14 which will cause air to go from the goose neck 12, pipe 11, from the heating chamber 8 with the result that warm air from the heating chamber will be forced through the pipe 31 to the interior of the vehicle.

When more rapid action is desired the valve 29 may be rotated so that the exhaust may pass through the pipe 28 or if it is desired to stop the draft entirely the valve may be entirely closed.

It will thus be seen that we have provided a very simple device for accomplishing the objects above set forth and one which will not retard the escape of the exhaust gases from the engine.

It is to be understood that the form of our invention, herewith shown and described is to be taken as a preferred example of the same, and that various changes in the shape, size and arrangement of parts may be resorted to without departing from the spirit of the invention, or the scope of the subjoined claim.

Having thus described our invention, we claim:—

In an automobile heater, an exhaust manifold having a heating chamber formed thereon, a pipe extending from said heating chamber, a goose neck secured to said pipe, a casting secured to said manifold, a shaft centrally positioned in said casting, a fan located upon one end of said shaft, the blades of said fan partially lying in the path of exhaust gases passing through said manifold, a second fan positioned on the opposite end of said shaft in a part of said casting positioned from said first mentioned fan, said second fan adapted to receive heated air from said goose neck, and means for delivering said heated air to a distant point.

In testimony whereof we affix our signatures.

JOSEPH DEL COZZO.
GLENN ENSIGN.